United States Patent [19]

Jordan

[11] 4,292,520

[45] Sep. 29, 1981

[54] LIQUID SCINTILLATION SPECTROMETRY PROCESS AND APPARATUS

[76] Inventor: Pierre Jordan, Carmenstr. 41, CH-8032 Zurich, Switzerland

[21] Appl. No.: 71,867

[22] Filed: Sep. 4, 1979

Related U.S. Application Data

[63] Continuation-in-part of Ser. No. 54,907, Jul. 5, 1979, abandoned.

[51] Int. Cl.³ ............................ G01T 1/00; B01T 1/20
[52] U.S. Cl. ...................................... 250/328; 250/364
[58] Field of Search ................. 250/328, 252, 361 R, 250/364, 369

[56] References Cited

U.S. PATENT DOCUMENTS

| | | | |
|---|---|---|---|
| 3,560,744 | 2/1971 | Jordan | 250/328 |
| 4,085,325 | 4/1978 | Atallah et al. | 250/328 |
| 4,187,426 | 2/1980 | Jordan | 250/328 |

*Primary Examiner*—Alfred E. Smith
*Assistant Examiner*—Janice A. Howell
*Attorney, Agent, or Firm*—Frishauf, Holtz, Goodman & Woodward

[57] ABSTRACT

The invention relates to a liquid scintillation spectrometry process and apparatus permitting the analysis of samples having a fluorescence efficiency quenching comprising chromatic quenching and chemical quenching. According to the invention, an external standard ionizing radiation source is used which is associated with a collimating means permitting the irradiation of the sample to be restricted to a small area. According to a first variant, two separate measurements are carried out on fluorescence radiations having different optical paths. These two measurements make it possible to determine a coefficient which represents the ratio between the chromatic quenching and the chemical quenching. In a second variant, the irradiation area is selected in such a way that the overall quenching is no longer dependent on this ratio.

12 Claims, 6 Drawing Figures

LIQUID SCINTILLATION SPECTROMETRY PROCESS AND APPARATUS

This is a continuation-in-part of my copending application having the same title and substantially the same text, Ser. No. 54,907 executed by me on June 22, 1979, and filed on July 5, 1979 now abandoned.

BACKGROUND OF THE INVENTION

The present invention relates to a liquid scintillation spectrometry process and apparatus permitting the analysis of samples having a quenching of the fluorescence efficiency resulting from both a chromatic quenching and a chemical quenching.

It is known that one of the disadvantages of liquid scintillation spectrometry is the quenching of the fluorescence efficiency (number of fluorescence photons emitted per unit of energy dissipated in the scintillator) which generally leads to a reduction in the measuring efficiency (number of pulses counted per unit of time for a given sample). This quenching cannot be calculated because it is dependent on a large number of parameters, many of which are not known at the time of measuring. It is therefore necessary to determine it experimentally for each sample.

A large number of processes have been suggested for this purpose. One for example consists of the use of an external standard radioactive source, whereby a supplementary measurement of the spectrum induced by it is performed in the sample. It is possible to determine the overall quenching of the sample by measuring the relationship of the counting rates in two different energy channels.

Another process is known which uses a standard external radioactive source and which no longer consists of merely measuring the quenching and instead also automatically corrects the sensitivity of the spectrometer in order to compensate this effect. The latter process formed the object of U.S. Pat. No. 3,560,744 granted to T. Jordan on Feb. 2nd 1971 and entitled "Method and apparatus for compensating quenching in liquid scintillation counting", the latter patent being considered as incorporated into the present description.

However, these correction methods are only accurate if the fluorescence quenching is not due both to chemical quenching and chromatic quenching. In this case the fluorescence efficiency of the solution is dependent on the respective contributions of these two effects in such a way that if said contributions are unknown, it is impossible to make a precise correction of the counting rate.

In order to facilitate the description which follows, it is pointed out that the time chemical quenching designates a phenomenon which leads to a reduction in the number of photons emitted by a liquid scintillator under the action of chemical agents, so-called quenchers, present in the solution. It is also pointed out that colour or chromatic quenching is a phenomenon which leads to a reduction in the number of photons reaching the detection means due to their partial absorption on passing through the liquid scintillator.

Thus, chemical quenching is due to a molecular process which occurs at the pont of fluorescent radiation emission, whilst chromatic quenching occurs after said emission.

The necessity of taking separate account of these two types of quenching has already been noted. My prior application Ser. No. 889,885, filed on Mar. 24, 1978, now U.S. Pat. No. 4,187,426 entitled "Liquid scintillation spectrometry process and apparatus" contains a discussion of this question and the latter specification must also be considered as incorporated into the present description. It also describes a liquid scintillation spectrometry process and apparatus taking account of the two types of quenching. To this end, a parameter B is measured which gives the respective contributions of chromatic quenching and chemical quenching. According to said invention, parameter B is obtained in the following way. Through the sample to be measured is passed a scintillation radiation produced by a standard fluorescent source placed in the vicinity of the sample, said source comprising, for example, a solid scintillator exposed to an $\alpha$ or $\beta$ radiation source. The scintillation supplied by this standard source supplies an amplitude spectrum which is measured. One of the significant characteristics of the said spectrum is determined, for example the counting rate ratio in two different energy channels. It is this ratio which gives parameter B.

The main parameter G determining the overall quenching of the sample is determined, as in the known methods, by using a standard source $\gamma$ and then measuring the counting rate ratios in two different energy channels. The knowledge of the two parameters B and G makes it possible to accurately determine the fluorescence efficiency and consequently to correct the spectrometer.

Thus, this procedure requires the use of two external sources, one emitting a fluorescent radiation and the other an ionizing radiation. It is possible to use only one source, naturally provided that it emits both radiation types, but in any case two different spectrometries are required for the two radiation types used. The present invention obviates this problem and proposes a different procedure.

BRIEF SUMMARY OF THE INVENTION

The invention has for its object a liquid scintillation spectrometry process making it possible to determine the chromatic quenching and the chemical quenching of the samples to be measured.

Another object of the invention is a process which makes it possible to automatically correct the spectrometry means for compensating a fluorescence reduction due to chromatic quenching and chemical quenching.

A further object of the invention is a liquid scintillation spectrometer which comprises means for determining the chromatic quenching and chemical quenching of the samples to be measured.

Finally, the invention has for its object a liquid scintillation spectrometer comprising means such that its sensitivity is automatically corrected as a function of the chromatic and chemical quenching.

According to the invention, the external standard used is an ionizing radiation source and the irradiation of the sample is restricted to an area of limited size. The invention provides two slightly different variants:

(1) In the first, two separate measurements are carried out on two different fluorescent radiations by selecting a quenching zone of the scintillator such that the optical paths of the two fluorescent radiations through the sample differ between the place of their production and the places of their detection. The pulse spectra obtained by these two measurements thus have certain differences making it possible to determine the ratio of the two quenching types.

(2) In the second variant, the position of the irradiated zone is selected in such a way that the pulse spectrum obtained is no longer dependent (or depends only slightly) on the ratio of the two quenching types.

More specifically, the process of the invention involves irradiating a small partial volume of the sample by an ionizing external standard source and performing double-channel spectrometry at photodetector locations providing different optical paths through the sample from the irradiated partial volume. Each double-channel spectrography produces a counting rate ratio and these ratios are compared for the two photodetector locations to produce a ratio of ratios designated as a parameter B. At the same time, the sum of the scintillations simultaneously detected by the two photodetectors is also counted in double-channel analysis to provide a parameter $G_s$. The foregoing procedure is, on the one hand, used on a series of standard solutions having predetermined chromatic and chemical quenching proportions to provide calibrating data in terms of correspondence between parameters B and $G_s$, the chemical/chromatic quenching proportions and the fluorescence efficiency, so that by reference to this data, the values of B and $G_s$ obtained by the same procedure with a sample of unknown proportions of chromatic and chemical quenching can be determined and of course also the fluorescence efficiency.

The apparatus of the invention has a measuring chamber and an external standard source emitting an ionizing radiation associated with means for collimating the radiation (i.e. producing a beam) and causing it to pass through a columnar partial volume of the sample. At respectively different photodetector locations providing different optical paths through the sample, from the irradiated partial volume, means are provided for performing double-channel spectrometry, in each case having a photodetector, counting channels and means for calculating the count ratio for the channel pair relating to each location. A divider is then provided for obtaining the ratio of the respective count ratios of the two locations, the result being designated parameter B. There are also means for adding simultaneous photodetector outputs and obtaining a double-channel ratio for the results of the addition, which is designated as parameter $G_s$. Finally, an information store is provided for calibration data giving the correspondence between parameters B and $G_s$ for samples having a known relative proportion of chromatic and chemical quenching, by reference to which measurements of B and $G_s$ on test samples can be converted into the proportion of chromatic and chemical quenching, and also the fluorescence efficiency. The requirement of different optical paths from the irradiated partial volume to the photodetectors usefully obtained by an eccentric location of the irradiated partial volume.

For the purpose of the second variant of the method and apparatus of the invention, a special eccentric location of the irradiated partial volume of the sample is used for which a calibration curve for one type of quenching coincides with the calibration curve for the other type. Such a location can be verified experimentally. Corresponding external excitation measurements are then made for samples to be measured while retaining the determined position for the irradiated partial volume. The word "external" is used as is common in the art to refer to radiation from a source outside the fluorescent solution, rather than from source provided within the solution. The significant difference in method and apparatus relating to the photodetectors in the second variant is that here one photodetector is used to produce a ratio G between he counts respectively registered in two energy range channels, whereas the other is used in anticoincidence as an operational check.

BRIEF DESCRIPTION OF THE DRAWINGS

The invention will be described in greater detail hereinafter relative to non-limitative embodiments and with reference to the attached drawings, wherein show.

DETAILED DESCRIPTION OF THE PREFERRED EMBODIMENTS

Figure 1:
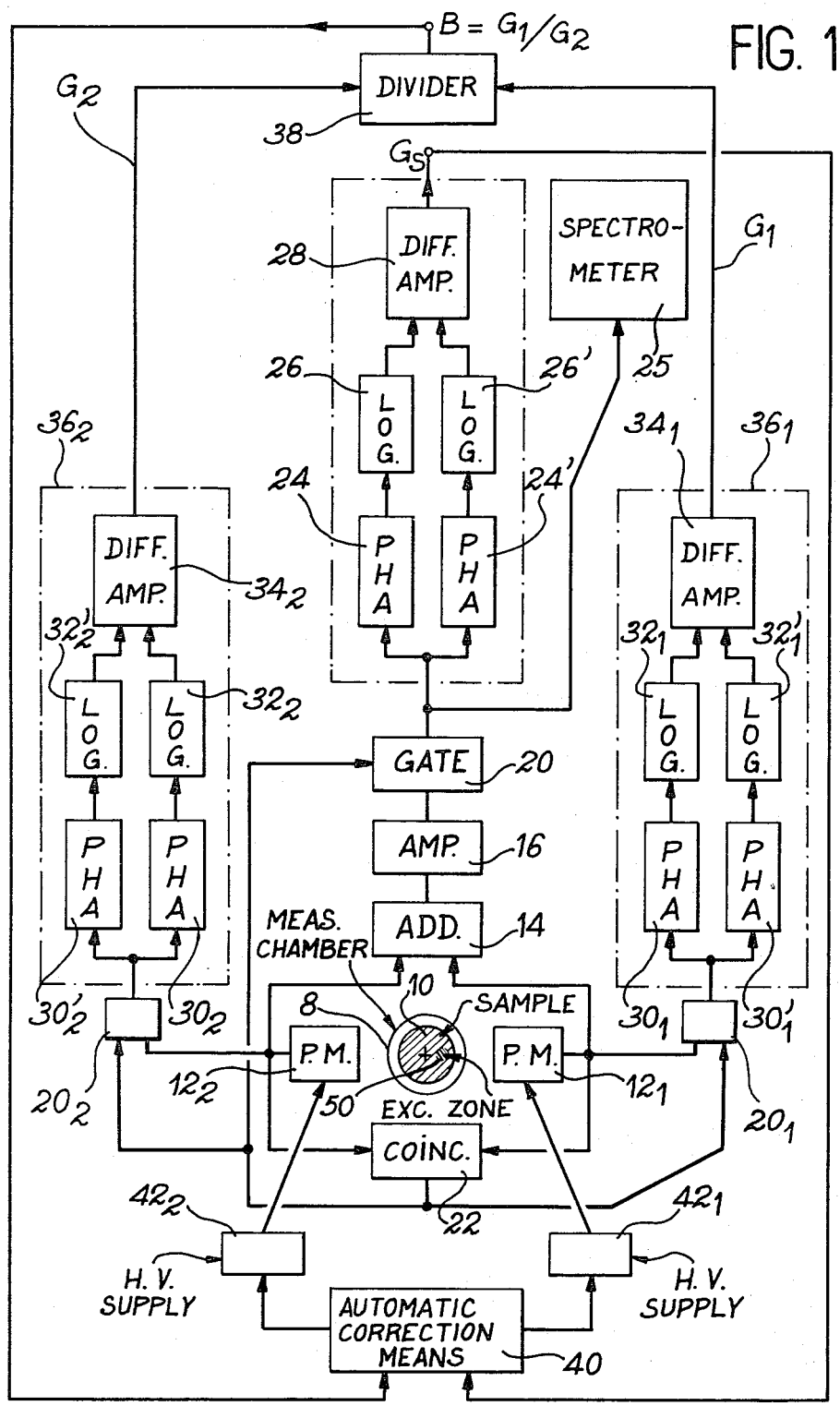
FIG. 1 a diagram of a liquid scintillation spectrometer according to the first variant of the invention.

The liquid scintillation spectrometer shown in FIG. 1 comprises a camera obscura 8 provided with a location for receiving the samples 10, either for measuring or for calibration. The scintillations produced in the sample in place are detected by two photomultipliers $12_1$ and $12_2$. These signals supplied by these two photomultipliers are added in a circuit 14 which activates an amplifier 16, whose output is connected to a gate 20. The latter is controlled by a circuit 22 which opens the gate when there is a simultaneous emission of signals by the two photomultipliers $12_1$ and $12_2$ (so-called coincidence operation), or which opens the gate when one or other of the two photomultipliers emits (so-called anticoincidence operation).

The output of gate 20 is connected to two channels in parallel, each constituted by a pulse height analyser 24 (24') and a logarithmic counter 26 (26'). Each of these channels serves to measure the activity of different radioactive elements (tritium, carbon 14, phosphorus 42) containing a sample and the latter being in two different energy ranges. The two counters 26,(26') have their outputs connected to a differential amplifier 28 which supplies a signal $G_s$ equal to the ratio of the counting rates in the two channels.

The apparatus shown also comprises means for carrying out two different measurements on signals supplied separately by two photomultipliers $12_1$ and $12_2$. In the illustrated embodiment, these means comprise: A first pair of counting channels connected to the first photomultiplier $12_1$ and constituted by two pulse height analysers $30_1$ and $30'_1$ and two logarithmic counters $32_1$ and $32'_1$, said channels being followed by a differential amplifier $34_1$. The system constitutes a circuit $36_1$ for determining a parameter $G_1$ equal to the ratio of the counting rates corresponding to the first photomultiplier $12_1$.

A second pair of counting channels connected to a second photomultiplier $12_2$ and constituted by two pulse height analysers $30_2$ and $30'_2$ and two logarithmic counters $32_2$ and $32'_2$, said channels being followed by a differential amplifier $34_2$. The system constitutes a circuit $36_2$ for determining the parameter $G_2$ equal to the ratio of the counting rates corresponding to the second photomultiplier $12_2$. the circuits $36_1$ and $36_2$ can be respectively preceded by gates $20_1$ and $20_2$ opened by circuit 22.

The apparatus shown also comprises a divider 37 with two inputs connected to the outputs of circuits $36_1$ and $36_2$. This divider supplies a signal B equal to the quotient of $G_1$ by $G_2$.

Naturally, the apparatus comprises a spectrometer 25 for carrying out the desired spectrometry. Preferably, the apparatus also comprises a correction device 40 which, from the signals $G_5$ and B is able to control the high voltage supplies $42_1$ and $42_2$ connected to the photomultipliers $12_1$ and $12_2$. This device makes it possible to automatically regulate the sensitivity of the measuring system and consequently correct the spectrometry performed by circuit 25.

All the means described hereinbefore, when considered separately, are known and are described particularly in U.S. Pat. No. 3,560,744 and my earlier application, Ser. No. 889,885 filed Mar. 24, 1978, now U.S. Pat. No. 4,187,426 referred to hereinbefore.

The apparatus shown functions in the following manner. If the sample was completely irradiated by the external standard source (not shown in FIG. 1) the two photomultipliers $12_1$ and $12_2$ would detect identical scintillations and the measuring circuits $36_1$ and $36_2$ would supply identical signals $G_1$ and $G_2$. Contrary to this situation, which is that of the prior art, the invention provides for only a small area 50 being subject to ionizing radiation. It will now be shown how this area can be obtained. Its position is offset in the sample in such a way that the photons emitted in this area by the scintillator have to traverse within the sample different optical paths to reach the two photomultipliers. In the embodiment shown in FIG. 1 area 50 is much closer to photomultiplier $12_1$ than to photomultiplier $12_2$. Thus, the optical path is shorter for photons reaching the first photodetector than for photons reaching the second. Thus, the effects of the chromatic quenching are more pronounced for the second than for the first. Conversely, the chemical quenching does not depend on the location in the sample and will therefore be the same in both cases. Thus, ratios $G_1$ and $G_2$ will differ and this difference is only due to the chromatic quenching.

Figure 2:
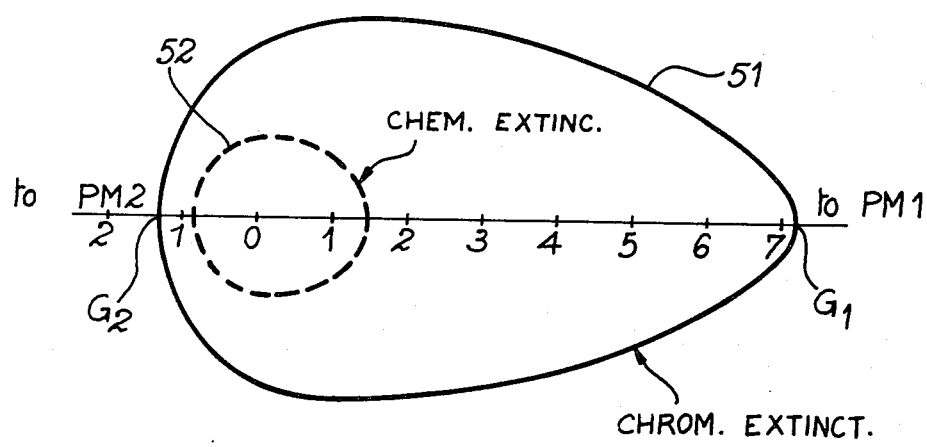
FIG. 2 a diagram showing how the two parameters $G_1$ and $G_2$ vary as a function of the azimuth position of the excited zone of the sample.

FIG. 2 further defines this question. It is a polar coordinate diagram showing the magnitude $G_1$ and $G_2$ obtained by rotating the excitation zone around the centre of the measuring chamber. The position of the zone is angularly fixed with reference to the line joining the two photomultipliers. This diagram relates to two standard solutions, one containing solely a chromatic quenching agent and the other solely a chemical quenching agent. Values of $G_1$ and $G_2$ obtained for different azimuth positions of the excited zone are noted for each of these two solutions. These values are radially entered on either side of the original on a straight line, which forms with the reference axis an angle equal to the azimuth of the excited zone. In this way, a curve is plotted representing simultaneous variations of $G_1$ and $G_2$, when the angular position of the excited zone varies by 360°.

For the first standard solution, with a purely chromatic quenching, a curve 51 is obtained and for the second standard solution which is a purely chemical quenching, a curve 52.

When the excited zone is in the position illustrated in FIG. 1, i.e. on the straight line connecting the two photomultipliers, curve 51 corresponding to the purely chromatic quenching gives $G_1 = 7.2$ and $G_2 = 1.3$, corresponding to a ratio $B = 5.53$. For the same position of the excited zone curve 52 gives $G_1 = 1.5$ and $G_2 = 0.8$, i.e. a ratio $B = 1.88$.

Thus, for this specific position of the excited zone, parameter B passes from 5.53 to 1.88 when the quenching passes from a purely chromatic type to a purely chemical type.

The invention recommends using this property of parameter B for measuring the respective parts of the two quenching types. This requires a prior calibration by means of solutions having known quenchings and this can be carried out in the following way. Firstly, a plurality of solutions formed contain a radionuclide and a scintillator identical to those contained by the samples to be measured and which also contain different predetermined quantities of a purely chemical quenching agent and a purely chromatic quenching agent. Thus, each of the solutions have chromatic and chemical quenchings which are in a predetermined known proportion. For example, it is thus possible to form 5 solutions having chromatic and chemical quenchings given as percentages by the following table:

| Solution No. | Chemical quenching in % | Chromatic quenching in % |
|---|---|---|
| 1 | 100 | 0 |
| 2 | 75 | 25 |
| 3 | 50 | 50 |
| 4 | 25 | 75 |
| 5 | 0 | 100 |

The extreme solutions (1 and 5) obviously only contain a chemical quenching agent in the first case and a chromatic quenching agent in the last.

Such agents are known and can, for example, comprise acetone or acetaldehyde for purely chemical quenching agent or methyl orange for the purely chromatic quenching agent.

Figure 3:
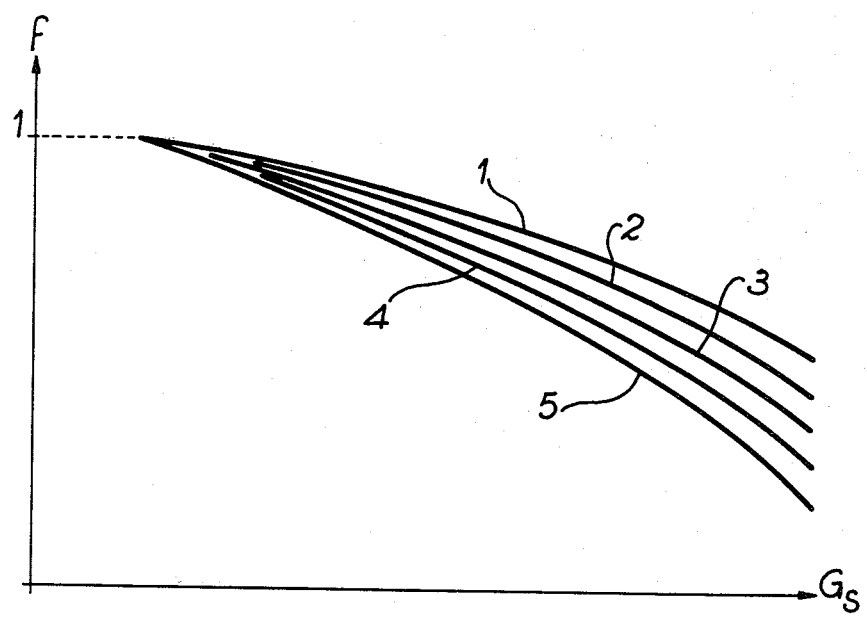
FIG. 3 a system of curves showing the correspondence between a parameter $G_s$ characterising the overall quenching of a solution and the measuring efficiency f for several standard solutions having chromatic and chemical quenchings is predetermined ratios.

The thus formed solutions are then analysed in an apparatus identical to that of FIG. 1. For each of them, the overall quenching is determined by measuring the main parameter $G_s$ and a system of 5 curves is plotted representing the measuring efficiency f as a function of parameter $G_s$, whereby the ratio of the chemical quenching to the chromatic quenching (which is known) being taken as the parameter. These 5 curves are shown in FIG. 3 where the efficiency f, brought to unity, is plotted on the ordinate and parameter $G_s$ on the abscissa. These curves are referenced by the number of the solutions to which they correspond. It is obvious that the difference between the extreme curves 1 and 5 relative to solutions with purely chemical and purely chromatic quenchings have been greatly exaggerated to facilitate the reading of the graph.

Figure 4:
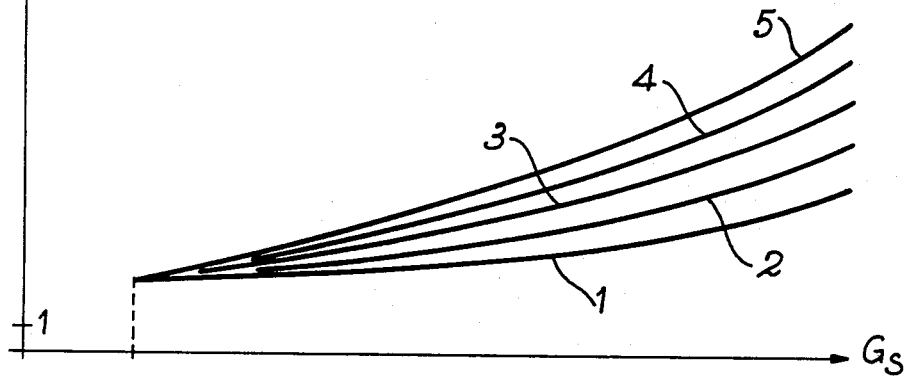
FIG. 4 another system of curves making it possible to determine, on the basis of the knowledge of parameters $G_s$ and B, the value of the ratio between the chromatic and chemical quenchings.

Using the same apparatus, it is then possible to plot another system of 5 curves by measuring, for each standard solution, parameter B in addition to parameter $G_s$. This is the system of FIG. 4 where B is plotted on the ordinate and the $G_s$ on the abscissa.

It is then easy to exploit these calibration data. Parameter $G_s$ and parameter B are measured for each sample to be analysed. The system of FIG. 4 then gives the relative proportion of the two quenching types, the measuring efficiency f being obtained relative to the system of FIG. 3.

It is obvious that it is possible to determine the measuring efficiency of a sample by reading on a graph in the manner described hereinbefore it is also possible to do this automatically using a microprocessor in which the calibration results have previously been stored in digital form.

The process and apparatus described hereinbefore make it possible to determine the measuring efficiency of a sample and consequently to correct the result of spectrometry performed by any known means. Although this correction can be subsequently carried out, it is preferably performed before the measurement. To this end, it is possible to act automatically on an instrument parameter in order to be able to compensate the quenching of the sample to be measured. In this application of the process of the invention, the spectrometry is performed by a system with a regulatable sensitivity, for example a system with two photomultipliers supplied by regulatable voltages and it is necessary to act on said sensitivity (in the present case on the voltages) to compensate the effects of chromatic and chemical quenchings.

This automatic correction is carried out by means 40 in FIG. 1, which will not be described in detail because they are known and are in particular described in my earlier application, Ser. No. 889,885 now U.S. Pat. No. 4,187,426 referred to hereinbefore.

Figure 5:
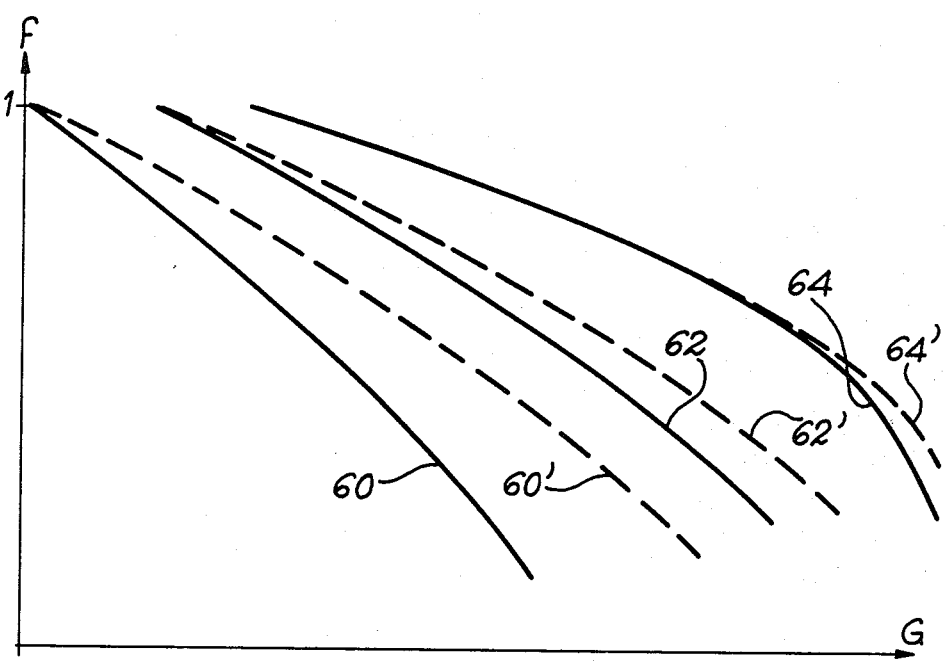
FIG. 5 external standardisation curves obtained for several positions of the excited zone of the sample and showing that there is a position of said zone for which the standardisation curves relative to the chromatic and chemical quenchings virtually coincide over a wide range.

In the second variant of the invention, the samples are irradiated in an area such that the two chemical and chromatic quenching variation curves coincide over a wide quenching range. This is illustrated by FIG. 5 which shows several pairs of curves plotted by placing the quenching parameter G on the abscissa and the fluorescence efficiency f on the ordinate.

These curves are obtained under the following conditions. The first photomultiplier $12_1$ of the apparatus of FIG. 1 is taken to be the measuring photomultiplier and the second $12_2$ is mounted in anticoincidence. Each pair of curves corresponds to a standard solution having a purely chromatic quenching (continuous line curve) or a purely chemical quenching (broken line curve). Curves 60 and 60' correspond to an irradiated area of the solution in the vicinity of the measuring photomultiplier (located in area 50 of FIG. 1). Curves 62 and 62' correspond to a median position located in the centre of the sample. Curves 64 and 64' correspond to a position remote from the measuring photomultiplier, substantially symmetrical to area 50 with respect to the sample axis.

The substantial coincidence of curves 64 and 64' clearly shows that if the irradiated area is sufficiently remote from the measuring photodetector the efficiency of the latter is essentially no longer dependent on the ratio of the chemical/chromatic quenchings and this applies over a wide quenching range.

In this privileged situation, the process and apparatus of the invention are significantly simplified because the operations and means for determining parameter B are no longer necessary.

Figure 6:
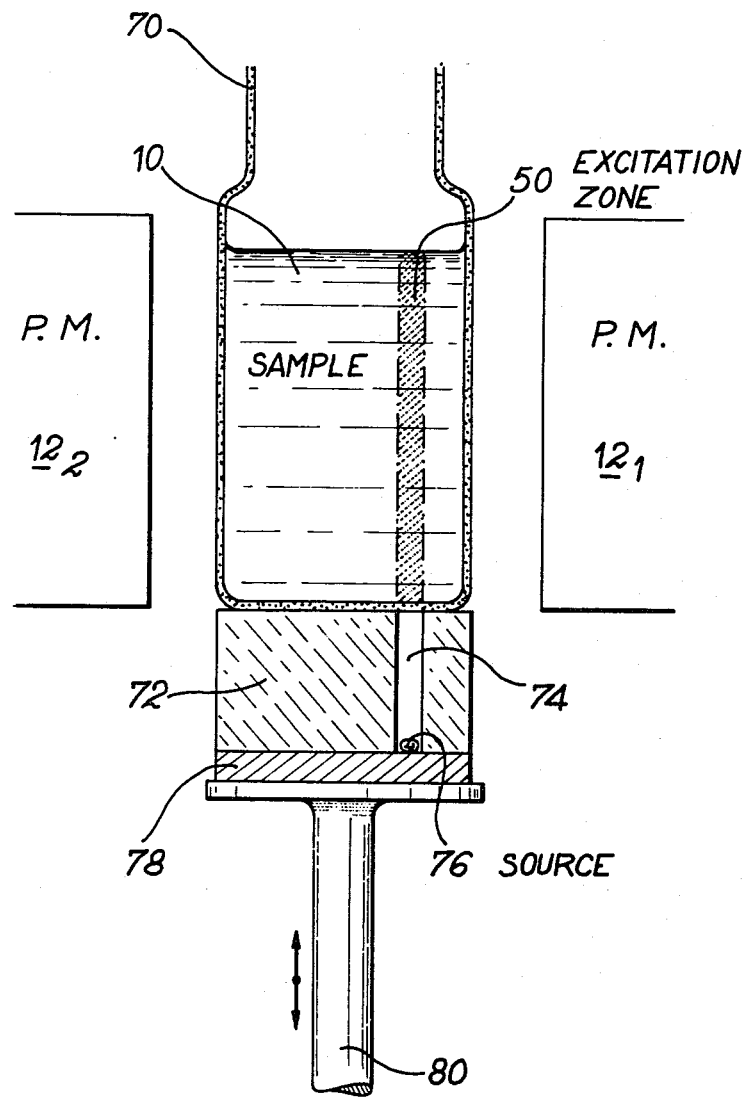
FIG. 6 diagrammatically and in longitudinal section, a special embodiment of a source and its joint collimation means for the emitted radiation.

FIG. 1 shows the measuring means of the apparatus according to the invention, but does not illustrate the sample excitation means. FIG. 6 diagrammatically and in cross-section shows an ionizing radiation source and its collimation means. A flask 70 contains a sample 10 to be analysed. In the lower part thereof is arranged a cylinder 72, e.g. made from lead, perforated by a channel 74 at the bottom of which is arranged an ionizing radiation source 76, for example of Ba-133. The system rests on a disk 78, for example of brass fixed to a retractile rod 80. Channel 74 defines the ionizing radiation emitted by the source and defines a narrow collimated beam which has excited a cylindrical area 50 in the sample. This area is offset with respect to the sample access and is positioned in accordance with one or other of the variants described hereinbefore. Said means are arranged between two photomultipliers $12_1$ and $12_2$ having a regulatable height. For information purposes, it is pointed out that for cylindrical flasks with a radius of approximately 12 mm the axis of zone 50 can be approximately 8 mm from the flask axis and its diameter (which is that of channel 74) can be of the order of 2.5 mm.

Naturally, it is possible to use a number of sources such as 76 associated with a number of channels 74, specifically in the second variant of the invention making it possible to improve the regulation of the operating conditions by adjusting the relative intensities of the emitted radiation.

The invention is not limited to the embodiments described and represented hereinbefore and various modifications are possible thereto without passing beyond the scope of the invention.

What is claimed is:

1. A liquid scintillation spectrometry process for samples having a fluorescence efficiency quenching comprising a chromatic quenching and a chemical quenching wherein:
   (a) an external standard source is used which emits an ionizing radiation;
   (b) using said source, a small area of the sample cross-section and hence a small columnar partial volume of the sample are irradiated;
   (c) double-channel spectrometry is performed by means respectively having first and second photodetectors as inputs thereof on a first and second fluorescent radiation emitted by said columnar volume and respectively having different optical paths through the sample between said columnar volume and the photodetector in each case and then for performing said double-channel spectrometry:
      (i) a ratio $G_1$ of the scintillation counting rates respectively obtained in two channels of different energies is measured by detecting the scintillations by a first of said photodetectors exposed to the first radiation;
      (ii) a ratio $G_2$ of the scintillation counting levels obtained in two channels of different energies is measured by detecting the said scintillations by a second of said photodetectors exposed to the second radiation;
      (iii) ratio $G_1/G_2$ is measured and this gives a parameter B;
   (d) a parameter $G_s$ is measured which is equal to the ratio of the scintillation counting rates obtained in two channels of different energies by measuring the sum of the scintillations simultaneously detected by the first and the second photodetectors;

(e) calibrations are carried out by the foregoing steps (b), (c) and (d) using standard solutions having predetermined chromatic and chemical quenching proportions as samples and a graphically displayable correspondence is established between parameters B and $G_s$, the chemical/chromatic quenching proportions and the fluorescence efficiency;

(f) the fluorescence efficiency of the another sample of unknown proportion of chromatic to chemical quenching is then deduced from said calibration and from the values of B and $G_s$ obtained by analysis of said sample.

2. A process according to claim 1, wherein the measuring operations of $G_1$, $G_2$ and $G_s$ are carried out simultaneously by means of three pairs of channels with different energies.

3. A process according to claim 1, wherein the correspondence between the values of $G_s$, B and the fluorescence efficiency are recorded in digital manner.

4. A liquid scintillation spectrometer for samples having a fluorescence efficiency quenching comprising a chromatic quenching and a chemical quenching, wherein it comprises:

(a) a measuring chamber;

(b) a means for successively introducing samples into the chamber;

(c) an external standard source emitting an ionizing radiation associated with means for limiting and collimating the radiation, said limited and collimated radiation being passed through a cross-sectional area of the sample much less than the total cross-sectional area thereof and hence through a columnar partial volume thereof;

(d) means for performing, at respectively different photodetector locations, a double-channel spectrometry on a first and a second fluorescent radiation emitted by said partial volume and having different optical paths through the sample, said means comprising, (i) a first photodetector at a first location adjacent said chamber exposed to the first radiation connected for supplying electrical pulses directed towards a first pair of counting channels of different energies and a first circuit for calculating the ratio $G_1$ of the counting rates obtained in the two channels of the first pair;

(ii) a second photodetector at a second location adjacent said chamber exposed to the second radiation connected for supplying electrical pulses directed towards a second pair of counting channels for different energies and a second circuit for calculating the ratio $G_2$ of the counting rates obtained in these two channels of the second pair, the first and second photodetectors facing the measuring chamber, said columnar partial volume of said chamber being closer to one of said photodetector locations than to said second photodetector location;

(iii) a dividing circuit with two inputs connected to the first and second calculating circuits and supplying a parameter B equal to the ratio $G_1/G_2$;

(e) a means for determining a parameter $G_s$ comprising an adder connected to the first and second photodetectors, a third pair of counting channels of different energies connected to the adder and a third circuit for calculating the ratio of the counting rates obtained in the channels of the third pair, which gives parameter $G_s$;

(f) an information store for calibration data giving the correspondence between parameters B and $G_s$, the relative proportion of the chromatic and chemical quenching and the fluorescence efficiency by reference to which said proportion and efficiency may be determined from measured values of parameters B and $G_s$.

5. A liquid scintillation spectrometry process for samples having a fluorescence efficiency quenching comprising a chromatic quenching and a chemical quenching, wherein:

an external standard source emitting an ionizing radiation is used;

standard solutions are formed having the purely chromatic quenching and other such standard solutions having a purely chemical quenching and in turn placed in a container for irradiation;

a small columnar part of the volume, in said container, of the solutions is irradiated with this source;

external calibration curves are plotted for the two types of standard solution by measurement of two energy differentiated channels responsive to the output of one photodetector adjacent to said container while anticoincidental events are registered in two energy differentiated channels responsive to another and differently located photodetector adjacent to said container;

from said curves a position of the irradiated columnar part of the solution volume is determined for which a calibration curve for one type of quenching coincides with a calibration curve for the other type of quenching;

the standard solutions are replaced by the samples to be measured, whilst retaining the same position for the irradiated columnar part of the solution volume;

corresponding external measurements of the double-channel ratio G are performed for each sample.

6. A liquid scintillation spectrometer for a plurality of samples having a fluorescence efficiency quenching resulting from a chromatic quenching and a chemical quenching, which comprises:

(a) a measuring chamber;

(b) a means for successively introducing samples into the said chamber;

(c) an external standard source emitting an ionizing radiation associated with a means for limiting and collimating said radiation, said limited and collimated radiation being directed by said last mentioned means through a zone which is offset with respect to the center of the sample to increase the path therefrom to a photodetector location so much that the fluorescence efficiency of the sample is not dependent on the chromatic or chemical nature of the quenching;

(d) at least one photodetector at said photodetector location facing the measuring chamber;

(e) signal processing means providing two counting channels of different energies connected to the output of the photodetector, and means for measuring the ratio of the counting rates respectively obtained in the two channels.

7. An apparatus according to claim 4, wherein the limiting and collimating means comprises a shield which is impermeable to ionizing radiation, which is perforated by a channel, said shield being placed between the measuring chamber and the standard source, positioned in front of the channel.

8. An apparatus according to claim 7, wherein the samples are contained in flasks having an axis of symmetry, whilst the channel of the shield has a direction parallel to said axis and an offset position with respect to the axis.

9. A process according to claim 1, wherein a sample is subject to spectrometry and said spectrometry is automatically corrected as a function of the measured fluorescence efficiency.

10. A process according to claim 9, wherein for correcting the spectrometry a spectrometry system of regulatable sensitivity is used and said sensitivity is subjected to automatic adjustment as a function of the measured efficiency.

11. An apparatus according to claim 4, which also comprises a spectrometer and a correction means for said spectrometer.

12. An apparatus according to claim 11, wherein the correction means is a circuit for the automatic control of the high voltage supply of the photodetectors.

* * * * *